United States Patent [19]
Niino et al.

[11] Patent Number: 5,053,188
[45] Date of Patent: Oct. 1, 1991

[54] REACTOR SYSTEM

[75] Inventors: Tsuyoshi Niino, Hitachi; Yoshiyuki Kataoka, Ibaraki; Matsuo Morikawa; Kazuhito Koyama, both of Hitachi, all of Japan

[73] Assignee: Hitachi, Ltd., Tokyo, Japan

[21] Appl. No.: 336,423

[22] Filed: Apr. 11, 1989

[30] Foreign Application Priority Data

Apr. 12, 1988 [JP] Japan .................................. 63-90087

[51] Int. Cl.$^5$ ............................................... G21C 9/00
[52] U.S. Cl. ..................................................... 376/277
[58] Field of Search ................ 376/277, 283, 285, 298

[56] References Cited

U.S. PATENT DOCUMENTS

| | | | |
|---|---|---|---|
| 4,293,382 | 10/1981 | Ohsumi et al. | 376/308 |
| 4,533,514 | 8/1985 | Yamamoto et al. | 376/308 |
| 4,571,820 | 2/1986 | Matsumoto et al. | 376/260 |
| 4,830,815 | 5/1989 | Gluntz | 376/299 |
| 4,842,244 | 6/1989 | Panchison, Jr. | 251/26 |

FOREIGN PATENT DOCUMENTS 63596  4/1984  Japan .

Primary Examiner—Daniel D. Wasil
Attorney, Agent, or Firm—Antonelli, Terry, Stout & Kraus

[57] ABSTRACT

A reactor system of a boiling water type atomic power plant including a reactor pressure vessel, a primary containment vessel containing the reactor pressure vessel, a main turbine, a main steam piping extending through the primary containment vessel between the reactor pressure vessel and the main turbine, and inside and outside main steam isolation valves provided on the main steam piping inside and outside the primary containment vessel, respectively. A closure valve is provided on the main steam piping at a position near the primary containment vessel and is adapted to quickly close in less than 3 seconds upon a break accident of the main steam piping. A volume of the reactor pressure vessel allotted for accommodating steam is correspondingly enlarged to allow the closure valve to quickly close upon a break accident of the main steam piping.

5 Claims, 7 Drawing Sheets

REACTOR SYSTEM

BACKGROUND OF THE INVENTION

The present invention relates to a reactor system of a boiling water type atomic power plant, and in particular to a reactor system suitable for reducing an outflow of reactor coolant in the case of a break accident of a main steam piping and for reducing an amount of structural materials for a main steam piping system and a turbine building.

In a reactor system of a prior, typical boiling water type atomic power plant, steam generated in a reactor pressure vessel is supplied from a reactor building to a turbine building through a main steam piping. The main steam piping is disposed in a main steam tunnel between the reactor building and the turbine building, and inside and outside main steam isolation valves are provided near a primary containment vessel. Main steam having entered into the turbine building is supplied through a main steam stop valve and a main steam control valve to a main turbine to drive the same. The main steam stop valve acts to stop a supply of main steam to the main turbine in case of turbine trip, a period of time required for the closure of the stop valve being about 0.1 second such that the valve can be closed several ten times as fast as the main steam isolation valves. The inside and outside main steam isolation valves are opened during normal operation of the plant, but are closed in case of a break accident of the main steam piping to prevent the outflow of reactor coolant within a predetermined period of time. Accordingly, it is desired in case of a break accident of the main steam piping to quickly shut off all of the isolation valves for the reduction of an exposure dose. On the other hand, such quick closure of the isolation valves causes a severe transient phenomenon of a pressure increased in the reactor pressure vessel. More specifically, upon such quick closure of the isolation valves, pressure in a closed space, that is, a space in the reactor pressure vessel is rapidly raised by steam as generated, so that neutron flux or heat flux of the fuel assembly changes to severely affect the reactor system. To cope with the matter, a main steam stop valve of a quick closure type is provided in the turbine building to allow a space in the main steam tunnel to accommodate the generated steam, and a period of time for the closure of the inside and outside main steam isolation valves in case of accidents is limited to about 3 to 4.5 seconds taking into account of the volume of the reactor building and main steam tunnel. Consequently, some amount of reactor coolant in the form of vapor will flow outside of the reactor pressure vessel before the inside and outside main steam isolation valves are completely closed upon a break accident of the main steam piping.

An aseismic design condition for a reactor system is prescribed in "U.S. Regulatory guide 1.29 Seismic design classification" (Revision 3, September 1978), in which it is prescribed that an area on the side of a reactor pressure vessel from an outside main steam isolation valve and an area on the side of a main turbine from the outside main steam isolation valve are assorted into different seismic classes in design of a boiling water type atomic power plant. More specifically, a portion of the main steam piping on the side of the reactor pressure vessel from the outside main steam isolation valve must be designed in the highest seismic class: Seismic Category I while the main steam stop valve and a portion of the main steam piping on the side of the main steam turbine from the outside main steam isolation valve must be designed for the large seismic load in the seismic category I class on the basis of an evaluation of exposure dose which is assumed allowing for a period of time (3 to 4.5 seconds) required for the closure of the main steam isolation valves upon a break accident of the main steam piping. The turbine building, which is required to have a shield function, is designed in non-category I class, in which a seismic design load is small. However, since the main steam piping and the main steam stop valve in the turbine building are designed in the seismic category I class, the construction for supporting the main steam piping and the main steam stop valve must also be designed in the seismic category I class (seismic load is much larger than in the case of non-category I class) to have a large strength.

As described above, there is room for improving a design of a prior reactor system in safety and economical efficiency.

In a reactor system of a prior underground type atomic power plant, reactor building and turbine building are spaced away from each other by a large distance due to the terrain of the plant as compared with an on-ground type reactor system, so that a main steam piping is large in length. In this connection, Japanese Patent Laid-Open Publication No. 59-63596 describes a design for a reactor system, in which a quick closure valve is provided between an outside main steam isolation valve and a main steam stop valve on a main steam piping extending through a main steam tunnel. In this design, steam and water flowing out upon a break accident of the main steam piping are prevented from entering into a reactor building and a turbine building, and supporting structures downstream of the quick closure valve can be designed in the seismic class B (Japanese non seismic category I class) rather than in the seismic class B (Sl) equivalent to the class A (here, P(Si) and A are Japanese category I classes), so that an advantageous layout for pipings and buildings in terms of economical efficiency can be embodied. In case such arrangement is applied to a reactor system of a boiling water type atomic power plant on the ground, in which a main steam piping is small in length to have a small spatial volume, when a quick closure valve is quickly closed in a break accident of the main steam piping, a subsequent transient pressurization becomes too unstable and severe to be roped with an existent construction. Furthermore, it is not advisable in terms of plant thermal efficiency to make the main steam piping long in a boiling water type atomic power plant.

SUMMARY OF THE INVENTION

It is an object of the invention to solve the above-mentioned problems in the prior art.

To this end, the invention provides a reactor system of a boiling water type atomic power plant, which includes a reactor pressure vessel, a primary containment vessel containing the reactor pressure vessel, a main turbine, a main steam piping extending through the primary containment vessel between the rector pressure vessel and the main turbine, and inside and outside main steam isolation valves provided on the main steam piping inside and outside the primary containment vessel, respectively, and is characterized in that a closure valve is provided on the main steam piping at a position near the primary containment vessel and adapted to quickly close upon a break accident of the main steam piping, and a volume of the reactor pressure vessel allotted for accommodating steam is correspondingly enlarged to allow the closure valve to quickly close upon a break accident of the main steam piping.

In an aspect of the invention, the closure valve which can quickly close is preferably the inside main steam isolation valve of a quick closure type.

In another aspect of the invention, the closure valve which can quickly close is preferably the outside main steam isolation valve of a quick closure type.

In a further aspect of the invention, the reactor pressure vessel, of which volume is enlarged is preferably one for a natural circulation reactor.

DESCRIPTION OF THE PREFERRED EMBODIMENT

Figure 1:
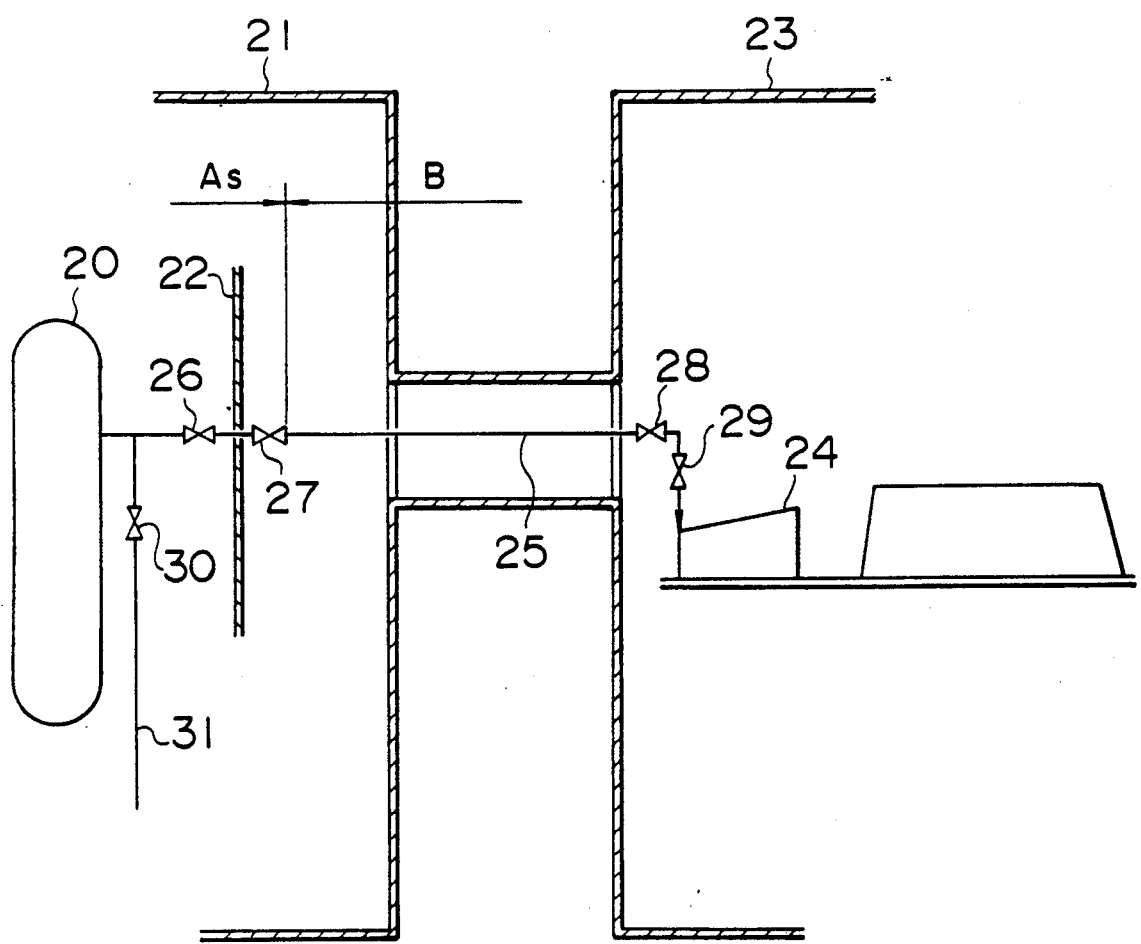
FIG. 1 is a schematic view of a reactor system according to an embodiment of the invention.

Referring to FIG. 1, a reactor system according to an embodiment of the invention includes a reactor pressure vessel 20, a primary containment vessel 22 accommodating the reactor pressure vessel and disposed in a reactor building 21, a main turbine 24 disposed in a turbine building 23, a main steam piping 25, an inside main steam isolation valve 26 of a quick closure type, an outside main steam isolation valve 27 of a conventional type, a main steam stop valve 28, a main steam control valve 29 and a piping 31. The main steam piping 25 extends through the reactor building 21 and turbine building 24 to supply main steam generated in the reactor pressure vessel to the main turbine 24. The inside main steam isolation valve 26 can be closed within 0.1 second which corresponds to one thirtieth of a period of time required for the closure of a conventional inside main steam isolation valve, and is provided on the main steam piping 25 inside the primary containment vessel 22 to serve as a quick closure valve operable in case of a break accident of the main steam piping 25. The outside main steam isolation valve 27 is provided on the main steam piping 25 outside and near the primary containment vessel 22. The main steam stop valve 28 and the main steam control valve 29 are provided on the main steam piping 25 near the main turbine 24. The main steam stop valve 28 is a conventional quick closure valve, and the inside main steam isolation valve acts in a similar manner to the main steam stop valve 28. The piping 31 provided with a safety relief valve 30 is connected to the main steam piping 25 at a position between the reactor pressure vessel 20 and inside main steam isolation valve 26.

As shown in FIG. 1, a portion of the main steam piping 25 extending from the outside main steam isolation valve 27 towards the reactor pressure vessel is designed in the aseismic highest class category I while the other portion of the main steam piping 25 extending from the outside main steam isolation valve 27 towards the main turbine, the main steam stop valve 28 and the turbine building 23 supporting them are designed in the seismic non-category I class.

Figure 2:
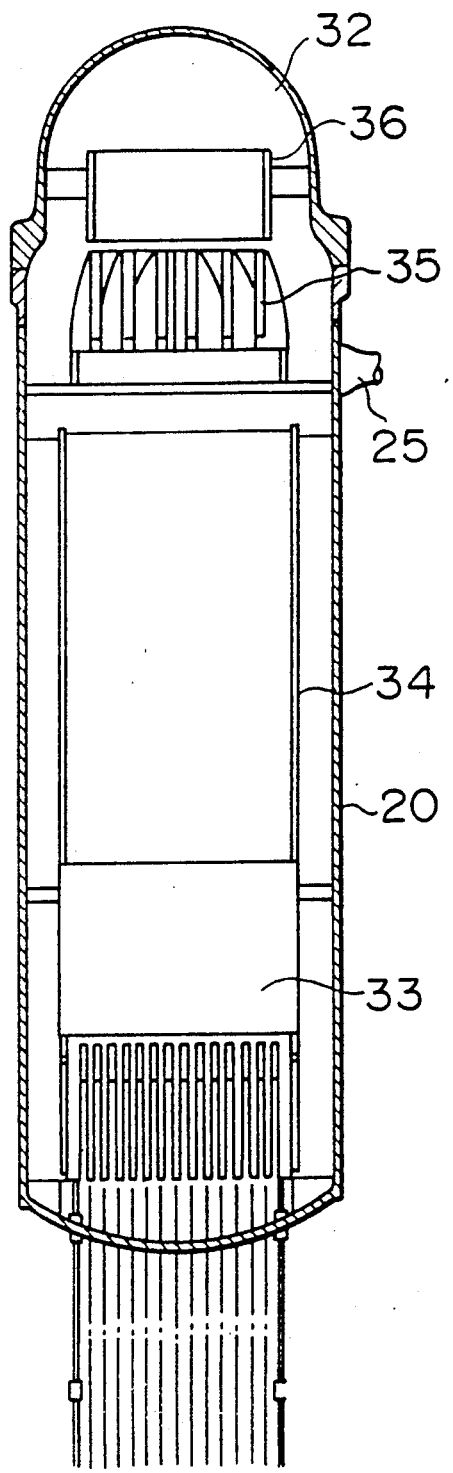
FIG. 2 is a vertically cross-sectional view of a reactor pressure vessel of the reactor system shown in FIG. 1.
Figure 3:
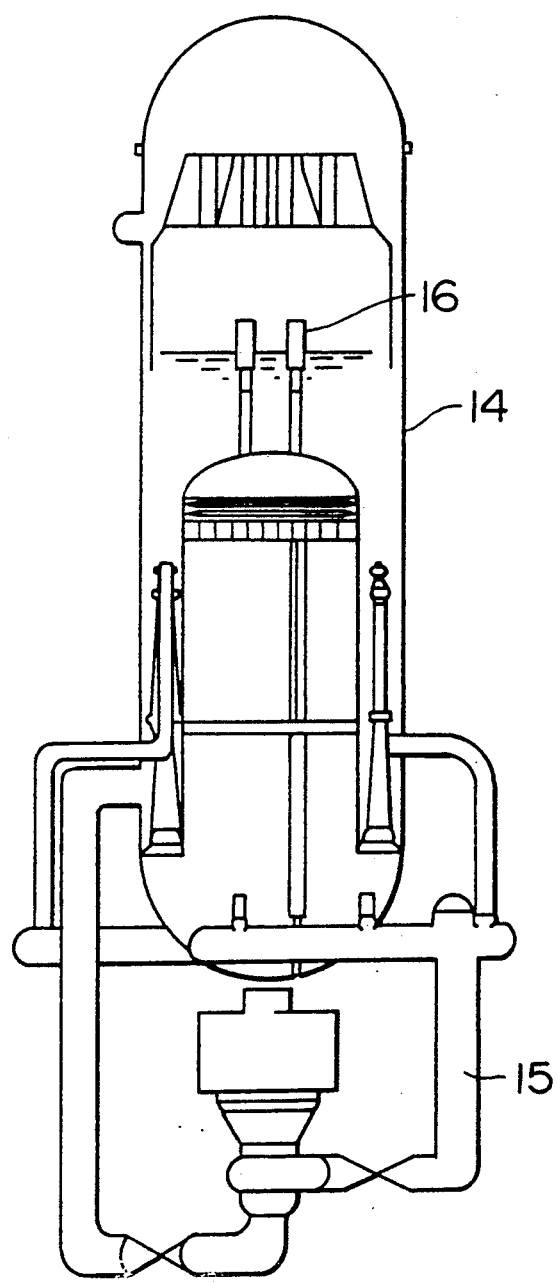
FIG. 3 is a fragmentary, elevational view of a reactor pressure vessel of a conventional boiling water type atomic power plant.

The reactor pressure vessel 20 in the embodiment of the invention is for a natural circulation reactor, and is of a simple construction to be dispensed with such piping 15 of reactor pressure vessel recirculation system and many steam separators 16 for forced circulation, unlike a reactor pressure vessel 14 of a prior forced circulation reactor shown in FIG. 3. Accordingly, the reactor pressure vessel 20 in the embodiment of the invention has in its upper construction only a solid portion one third of that in a prior forced circulation reactor. As shown in FIG. 2, the reactor pressure vessel 20 includes a reactor core 33, a cylindrical chimney 34 disposed above the reactor core and having a height of 9 meter, a dryer 35 disposed above the cylindrical chimney, an upper dryer tube 36 and a steam dome section 32. The cylindrical-shaped, upper dryer tube 36 is arranged in the steam dome section 32 above the reactor core 33, so that the steam dome section 32 has a larger volume than that in a prior boiling water type reactor which has the same level of output as that of the present reactor system. Therefore, an additional volume to be enlarged corresponding to a possible quick closure of the inside main steam isolation valve 26 caused in case of a break accident of the main steam piping can be made small, so that the transient phenomenon in the reactor pressure vessel 20 can be readily mitigated.

In the embodiment of the invention, when breakage accidentally occurs on a portion of the main steam piping 25 on the side of the main steam turbine 24 from the outside main steam isolation valve 27, the inside main steam isolation valve 26 quickly closes to enable substantially reducing an amount of coolant flowing out of a broken portion of the main steam piping 25 as compared with that in a prior reactor system. In this case, how severe the transient pressure phenomenon in the reactor pressure vessel 20 upon the quick closure of the inside main steam isolation valve 26 is problematic. Since the volume of the steam volume section 32 in the reactor pressure vessel 20 and the volume between the inside main steam isolation valve 26 and reactor pressure vessel 20 are adequately ensured, however, it is possible to mitigate the transient pressure phenomenon in the reactor pressure vessel 20.

Figure 4:
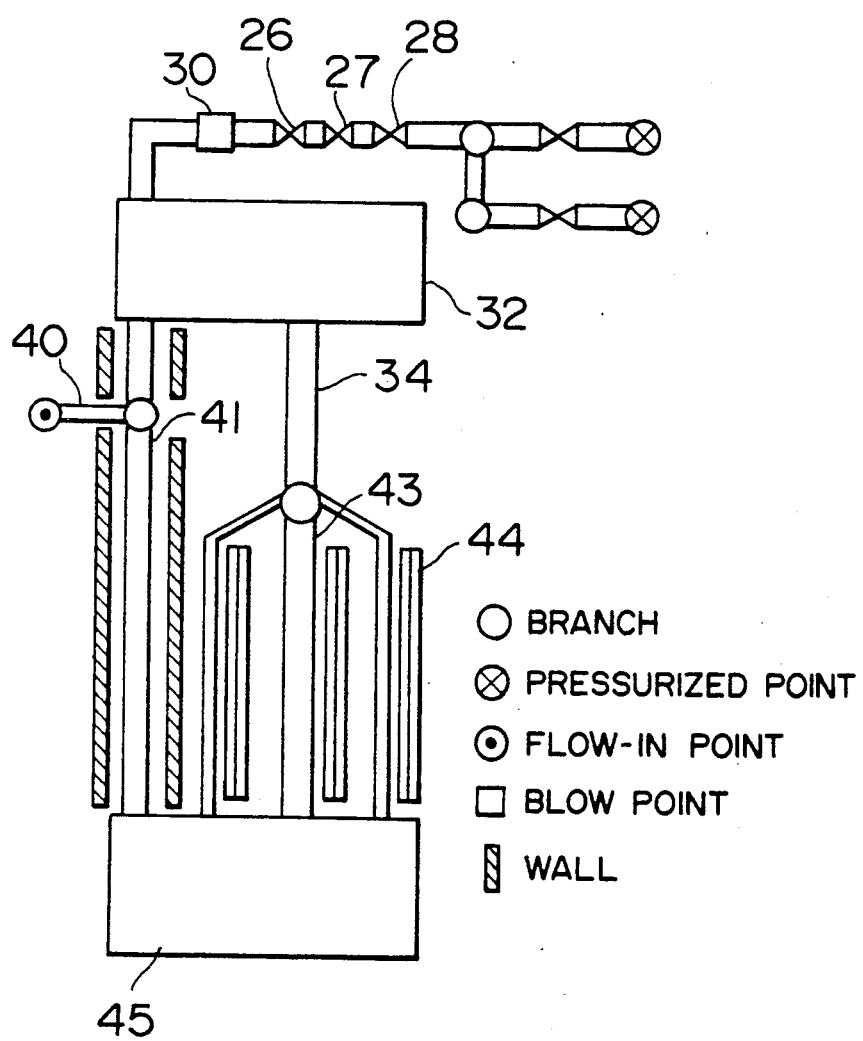
FIG. 4 shows a calculation model used for analysis of a transient phenomenon in the reactor system according to the invention.

An analysis will be given hereinbelow to a transient phenomenon in application of the present invention on a natural circulation reactor. Referring to FIG. 4, a calculation model of the reactor system employed for the analysis comprises the safety relief valve 30, main steam stop valve 28, inside main steam isolation valve 26 of a quick closure type, outside main steam isolation valve 27, steam dome section 32, feed water piping 40, downcomer 41, chimney 34, flow channel 43 of fuel assembly, fuel element 44 and lower plenum 45. The flow channel 43 of fuel assembly and fuel element 44 constitute the reactor core 33 as shown in FIG. 1. In FIG. 4, the same elements as shown in FIG. 1 are designated by the same reference numerals. A length of flow passage extending from the steam dome section 32 to the inside main steam isolation valve 26 is simulated be decreasing the volume of the flow passage, and quick closure of the inside main steam isolation valve 26 is simulated by rapidly decreasing an area of flow passage or the valve module to zero. Reactivities taken into consideration include void reactivity, doppler reactivity and reactivity of control rods.

Figure 5:
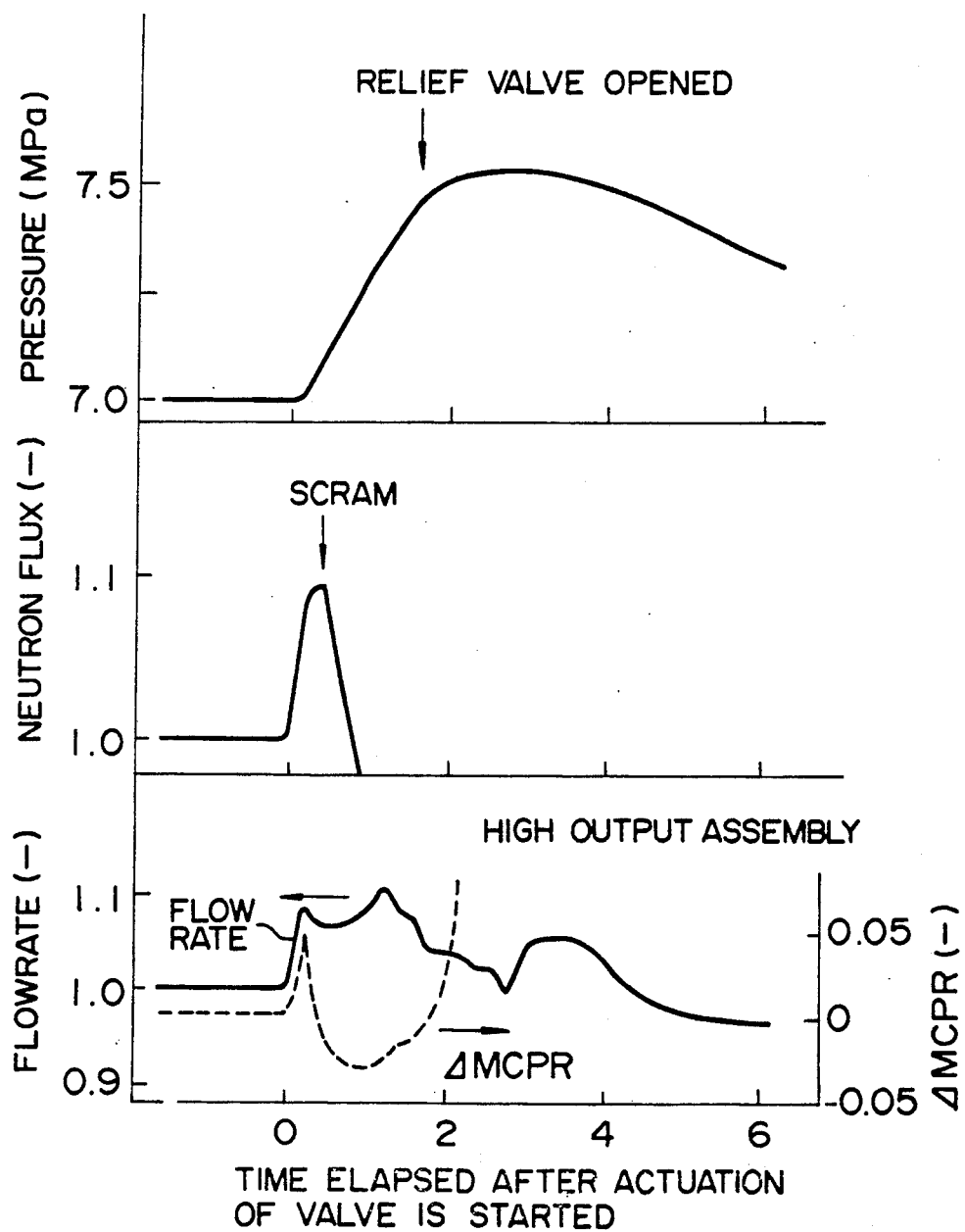
FIG. 5 shows a result of the analysis of a transient phenomenon.

FIG. 5 shows a result of a transient analysis in the case of quick closure of the inside main steam isolation valve 26. Pressure in the reactor pressure vessel 20 is raised upon the quick closure of the inside main steam isolation valve 26, and then the safety relief valve 30 operates to suppress the highest pressure. The pressure rise in the reactor pressure vessel 20 is accompanied by decrease of voids in the reactor core and causes void reactivity increase, which results in an increase of neutron flux. However, the volume in the reactor pressure vessel for accommodating vapor is large to make a speed of pressure rise low and scram (insertion of control rods) corresponding to a signal of quick closure of the inside main steam isolation valve 26, so that increase in neutron flux is suppressed to the extent of 1.1 times as large as that during the normal operation of the reactor system. Heat flux of fuel assembly is also suppressed while synchronizing in a time lag with a change in neutron flux. On the other hand, the flow rate of circulating reactor coolant is once increased since pressure rise causes voids in the reactor core to decrease thus reducing the flow resistance of two phase flow (liquid phase and vapor phase). Thereafter, the voids are reduced due to reduction of heat flux of fuel assembly and the average density of reactor coolant in the reactor core is increased to reduce the flow rate of the coolant. As a result, the change of the minimum critical power ratio ($\Delta MCPR$) is suppressed to 0.05 since the flow rate of reactor coolant is large at the time of large power immediately after the transient phenomenon and the power is small at the time of small flow rate. The above value is adequately small in comparison with the thermal margin in the normal operation, and no boiling transition phenomena occurs even upon the quick closure of the inside main steam isolation valve. In this manner, it is confirmed that the provision of the inside main steam isolation valve 26 of a quick closure type in the interior of the primary containment vessel 22 offers no problem in terms of a transient characteristics to enable quickly closing the valve 26 upon a break accident of the main steam piping 25. Such quick closure of the inside main steam isolation valve 26 decreases an amount of reactor coolant flowing out. Thus even when the main steam piping 25 is accidentally broken at a position between the inside main steam isolation valve 26 and the main turbine 24 by an earthquake corresponding to the seismic class: Seismic Category I, the inside main steam isolation valve 26 of a quick closure type quickly closes to decrease an amount of reactor coolant flowing out of a broken portion of the main steam piping 25, thereby suppressing the exposure dose to a slight extent as compared with the prior art. Accordingly, a portion of the main steam piping 25 extending from the outside main steam isolation valve 27 towards the main turbine, the main steam stop valve 28 and the turbine building 23 supporting these members can be designed in the non-category I class to thereby facilitate reduction of an amount of structural materials for equipments and pipings and construction of the turbine building. The enlarged steam volume section of the reactor pressure vessel mitigates a transient phenomenon associated with pressure rise caused due to vapor generated in the reactor pressure vessel after a break accident of the main steam piping to ensure safety and stability of a reactor system. While the inside main steam isolation valve 26 is of a quick closure type in the above embodiment, the outside main steam isolation valve may be alternatively of a quick closure type, in which the length of a flow passage extending from the steam dome section to the outside main steam isolation valve is larger than in the above embodiment to further mitigate the transient phenomenon for an improved effect.

Figure 6:
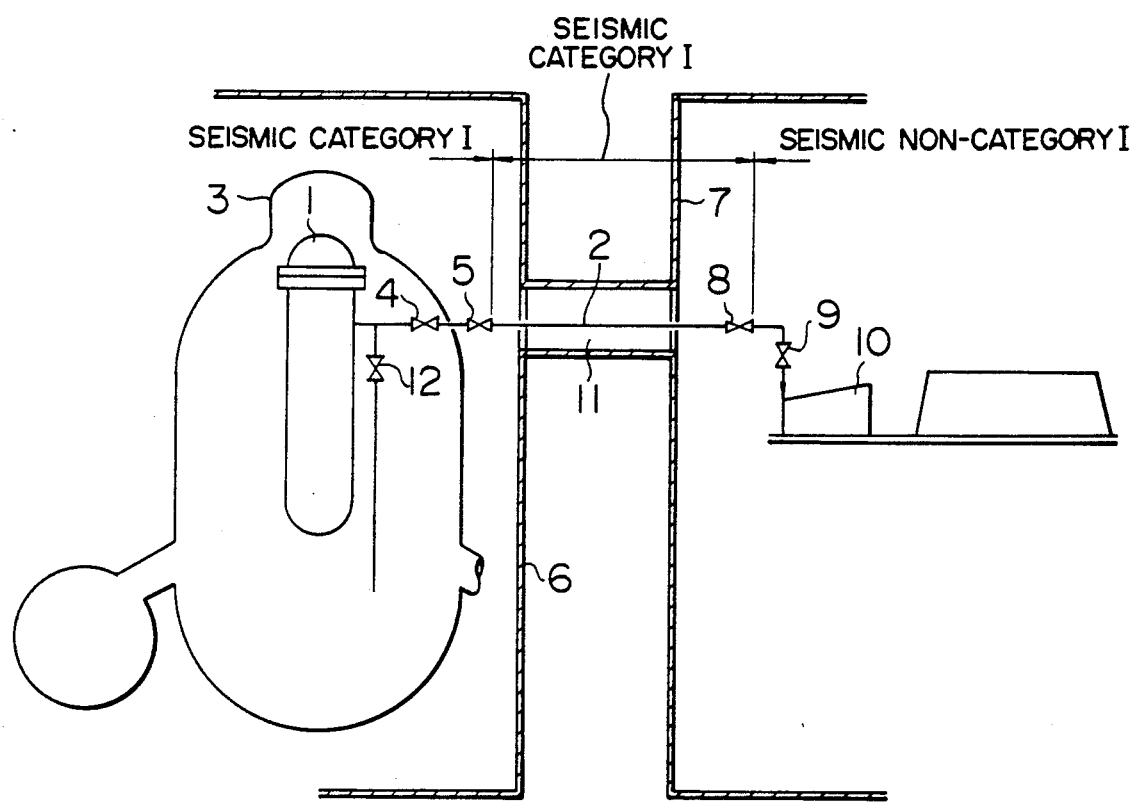
FIG. 6 is a schematic view of a prior reactor system.

Referring to FIG. 6, there is shown a reactor system of a conventional, typical boiling water type atomic power plant. Main steam generated in a reactor pressure vessel 1 flows from a reactor building 6 to a turbine building 7 through a main steam piping 2 disposed in a main steam tunnel 11, and is supplied via a main steam stop valve 8 and a main steam control valve 9 to a main turbine 10 for driving the same. The main steam piping 2 is provided with an inside main steam isolation valve 4 and an outside main steam isolation valve 5, both of which are disposed near a primary containment vessel 3. The main steam stop valve 8 acts to shut off a supply of main steam to the main turbine 10, and it takes 0.1 second to close the valve 8, so that it can close several tens of times as fast as the main steam isolation valves do. The inside and outside main steam isolation valves 4 and 5 are opened during a normal operation of the plant, and function to close in case of a break accident of the main steam piping 2 for the prevention of outflow of reactor coolant within a predetermined period of time. The inside and outside main steam isolation valves 4 and 5 are limited to 3 to 4.5 seconds in a period of time for closure. Therefore, some reactor coolant in the form of vapor will flow out of the reactor pressure vessel until the inside and outside main steam isolation valves have been fully closed. A portion of the main steam piping 2 on the side of the reactor pressure vessel 1 from the outside main steam isolation valve 5 is designed in the highest seismic class seismic category I class, and a portion of the main steam piping 2 on the side of the main turbine 10 from the outside main steam isolation valve 5 and the main steam stop valve 8 are designed in the seismic category I class on the basis of an evaluated exposure dose upon a break accident of the main steam piping, which takes into consideration a period of time (3 to 4.5 seconds) required for the closure of the main steam isolation valves. The turbine building which is required to have a shielding function is designed as a whole in the non category I class. Since the main steam piping 2 and the main steam stop valve 8 within the turbine building 7 are designed in the seismic category I class as described above, however, those elements which support these main steam piping and main steam stop valve are also designed corresponding to the seismic category I class to be of a firm construction.

Figure 7:
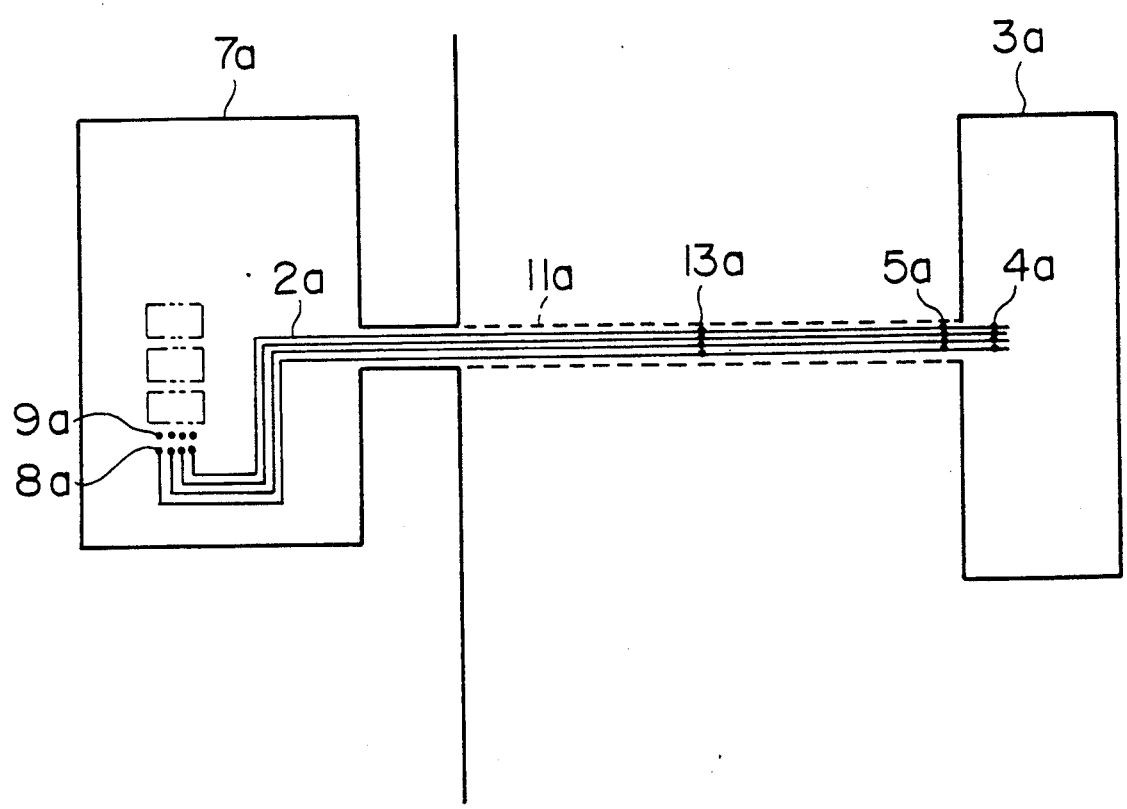
FIG. 7 is a schematic view of a prior reactor system of an underground type atomic power plant.

Referring to FIG. 7, there is shown a reactor system of a conventional underground type atomic power plant. Reactor building 3a and turbine building 7a are spaced away from each other due to the terrain, so that a main steam piping 2a disposed in a main steam tunnel 11a is large in length. The main steam piping 2a is provided with a quick closure valve 13a which is disposed between an outside main steam isolation valve 5a and a main steam stop valve 8a. In the drawing, the reference numeral 4a designates an inside main steam isolation valve, and 9a a main steam control valve. With this arrangement, steam and water flowing out upon a break accident of the main steam piping 2a are prevented from flowing into the reactor building 3a and the turbine building 7a. Construction downstream of the quick closure valve 13a is designed in the non category I class.

While the invention has been described by way of an embodiment, it is to be understood that the invention is not limited to the embodiment but to the scope of the appended claims.

What is claimed is:

1. A reactor system of a boiling water type atomic power plant including a reactor pressure vessel, a primary containment vessel containing the reactor pressure vessel, a main turbine, a main steam piping extending through the primary containment vessel between the reactor pressure vessel and the main turbine, and inside and outside main steam isolation valves provided on the main steam piping inside and outside the primary containment vessel, respectively, at least the outside main steam isolation valve being disposed nearer to a wall of the containment vessel than other valves provided on the main steam piping outside of the containment vessel, at least one of the inside and outside main steam isolation valves being a quick closure valve enabling closure within a period of time of less than 3 seconds required for protection of a turbine at a time of interruption of turbine load, and a volume of the reactor pressure vessel allotted for accommodating steam being sufficient to permit the quick closure valve to quickly close and to mitigate a transient phenomenon associated with a pressure rise in the reactor pressure vessel due to the quick closure of the quick closure valve so as to insure safety and stability of the reactor system.

2. A reactor system as set forth in claim 1, wherein the inside main steam isolation valve is the quick closure valve.

3. A reactor system as set forth in claim 1, wherein the outside main steam isolation valve is the quick closure valve.

4. A reactor system as set forth in claim 1, wherein the reactor pressure vessel, is for a natural circulation reactor.

5. A reactor system as set forth in claim 1, wherein the quick closure valve enables closure within a period of time of about 0.1 second.

* * * * *